United States Patent [19]

Cantu et al.

[11] Patent Number: 4,527,626
[45] Date of Patent: Jul. 9, 1985

[54] PROCESS AND APPARATUS FOR REMOVING DISSOLVED OXYGEN

[75] Inventors: Lisa A. Cantu; Marvin E. Yost; Robert L. Coffee; James E. Stolhand, all of Ponca City, Okla.

[73] Assignee: Conoco Inc., Ponca City, Okla.

[21] Appl. No.: 607,914

[22] Filed: May 7, 1984

[51] Int. Cl.³ .......................... C25B 1/04; C25B 1/10
[52] U.S. Cl. .................................. 166/275; 166/305 R; 204/128; 204/129; 204/263; 204/266; 204/415; 423/580; 423/DIG. 13
[58] Field of Search ................ 204/129, 128, 415, 98, 204/263, 266; 166/268, 275, 304, 305 R; 423/248, 580, DIG. 13; 210/750; 252/472

[56] References Cited

U.S. PATENT DOCUMENTS

| 2,913,386 | 11/1959 | Clark | 204/415 |
| 4,171,350 | 10/1979 | Sanders | 423/248 |
| 4,238,331 | 12/1980 | Mitchell et al. | 166/268 |
| 4,272,338 | 6/1981 | Lynch et al. | 204/128 |
| 4,374,116 | 2/1983 | Chuang et al. | 423/580 |
| 4,424,863 | 1/1984 | White | 166/268 |

Primary Examiner—R. L. Andrews
Attorney, Agent, or Firm—Stephen A. Littlefield

[57] ABSTRACT

Saline source water containing dissolved oxygen is deoxygenated to form injection quality water in the disclosed process and apparatus. In accordance with the invention, saline source water is electrolyzed in an electrolytic cell which produces hydrogen and chlorine. The hydrogen is reacted with the dissolved oxygen in a catalyst resin bed to reduce the dissolved oxygen to the desired level. Optionally, evolved chlorine may be used as a biocide in the system.

9 Claims, 1 Drawing Figure

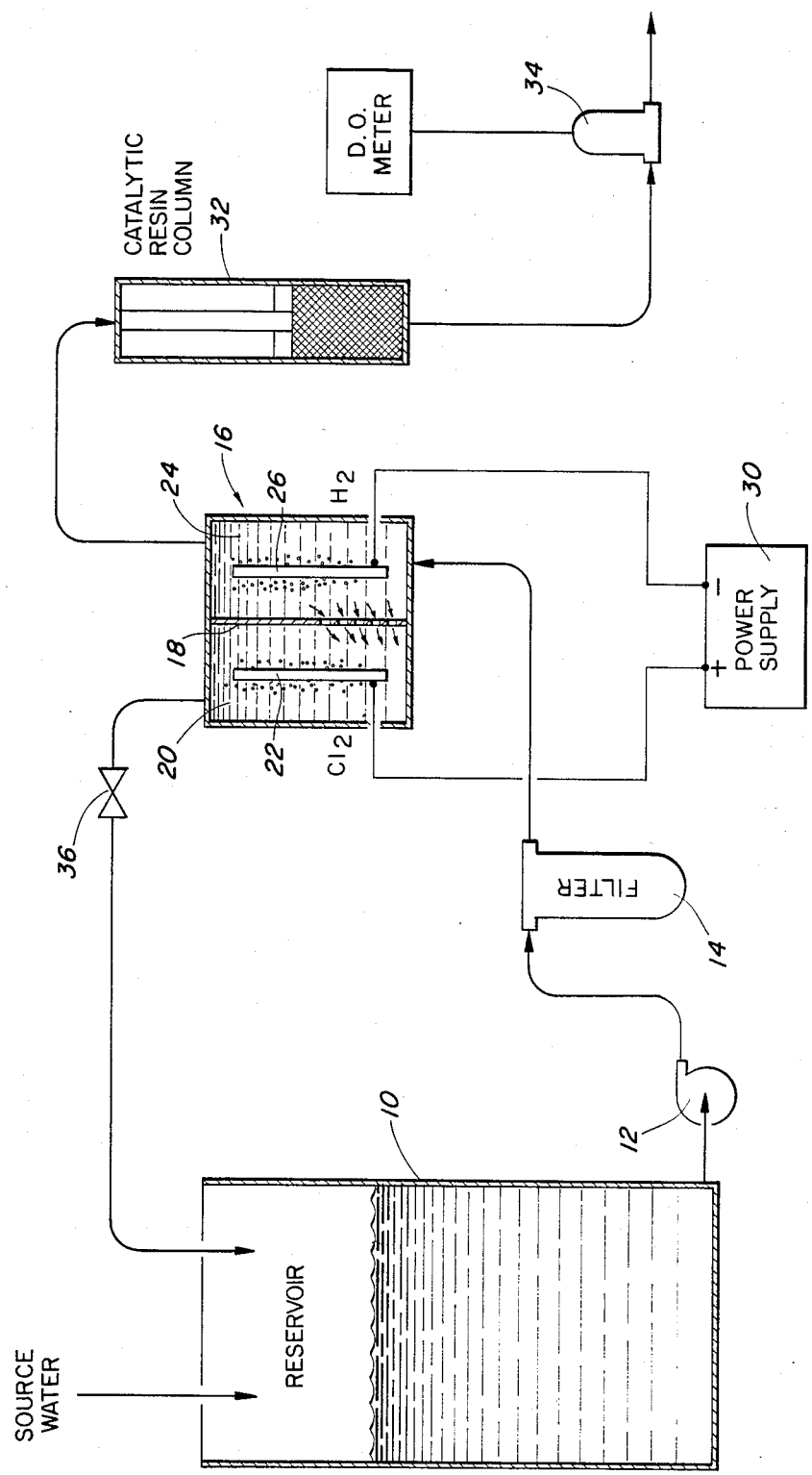

PROCESS AND APPARATUS FOR REMOVING DISSOLVED OXYGEN

This invention relates to the art of water injection for secondary oil recovery and, more particularly, to a process and apparatus for removing dissolved oxygen from seawater and produced oil field waters in order to reduce corrosion of equipment used in injecting such water into a hydrocarbon-bearing formation.

BACKGROUND OF THE INVENTION

Injection of water into oil producing formations has long been used for recovery of additional hydrocarbon values from such formations. The water used for such purposes may be produced water such as from the oil bearing formation or other subterranean water source, surface water and/or, particularly in an offshore environment, seawater. Such water generally contains large amounts of dissolved oxygen which, if not removed, will accelerate corrosion of oil field process equipment. Additionally, the products of such corrosion have an additional deleterious effect in that they can lead to plugging of the subterranean formation through gelation of various hydrated metal oxides.

For the above reasons, it has been common in the prior art to remove the dissolved oxygen from injection waters in order to avoid the corrosion and formation plugging potential of untreated water. Two of the most common methods are chemical deoxygenation and vacuum stripping. However, chemical systems are often incompatible with other well treatment fluids and may create additional suspended solids which are introduced into treating waters which adversely affect the hydrocarbon-bearing formation. The equipment employed in a vacuum deoxygenation operation comprises heavy, bulky and costly vacuum towers and pumping equipment. These disadvantages of the vacuum deoxygenation system employed on an offshore platform greatly increase the size and cost of such an installation, both in terms of the deoxygenator and the platform itself.

As an alternative to the above-noted chemical and mechanical processes for deoxygenating water, catalytic reduction of oxygen with hydrogen in the presence of a reduction catalyst has been suggested. In such a process, gaseous hydrogen is mixed with the water to be treated and passed over a bed of catalytic material. One particular type of catalyst preferred for this process is a palladium coated anion exchange resin produced by Bayer Chemical Company in Germany and sold as "Lewatit OC-1045". A biocide is also commonly added to the system in order to prevent bacterial growth on the resin. This process has the disadvantage of storage and transfer of highly explosive hydrogen as well as storage of a potentially dangerous and corrosive biocide, commonly chlorine.

SUMMARY OF THE INVENTION

The present invention affords a process and apparatus whereby saline seawater, ground water, or produced water are deoxygenated to a suitable level for injection into an oil bearing formation without the necessity of heavy, bulky and expensive vacuum equipment or the storage of dangerously explosive and corrosive chemicals.

In accordance with the invention, deoxygenated injection quality feed water is produced by filtering a saline source water in order to remove suspended solids. Following filtration, the saline source water containing dissolved salts is passed through an electrolytic cell to which direct current is applied. In this process, hydrogen is evolved at the cathode of the electrolytic cell and chlorine is evolved at the anode. The electrolized source water is then passed through a column containing a deoxygenation catalyst wherein dissolved oxygen in the source water is catalytically reacted with the evolved hydrogen gas. The effluent from the catalyst column comprises injection quality water having a dissolved oxygen content of less than about 20 parts per billion.

Further in accordance with the invention, the anolyte and catholyte of the aforementioned electrolytic cell are separated, the catholyte passing into the deoxygenation catalyst column. The anolyte with its evolved chlorine is directed into the source water feed stream wherein the chlorine effects a biocidal action on the source water prior to its filtration.

Still further in accordance with the invention, an apparatus for removing dissolved oxygen from a saline source water comprises conduit means for conducting the source water to a solids filtration unit and outlet means from the filtration unit for conducting the filtrate to electrolyzing means. The electrolyzing means comprises an anode, a cathode and a source of direct current as well as inlet and outlet means whereby the source water can pass through the electrolytic cell. From the outlet means of the electrolytic cell, conduit means extends into a catalytic deoxygenation column containing deoxygenation catalyst on a support resin. Outlet means on the deoxygenation column are also provided for directing the deoxygenated source water to its end use.

It is, therefore, an object of this invention to provide a means and method whereby water may be deoxygenated in a continuous process and which does not involve heavy, bulky and costly apparatus or the storage and use of dangerous and/or explosive chemicals.

It is a further object of this invention to provide an inexpensive means for continuously reducing the dissolved oxygen content of a source water to a level which will avoid corrosion of oil field water injection equipment with its consequent deterioration of components and damage to the producing formation.

BRIEF DESCRIPTION OF THE DRAWING

These and other objects of the invention are accomplished through the manner and form of the present invention to be further described hereinafter in greater detail and in conjunction with the accompanying drawing forming a part of this specification and in which the single FIGURE depicts a schematic flow-through system for water deoxygenation in accordance with the present invention.

DETAILED DESCRIPTION OF THE PREFERRED EMBODIMENT AND THE DRAWING

The invention will now be described in the more limited aspects of a preferred embodiment thereof including a number of parts and arrangements of parts. Such description of the preferred embodiment is for the purposes of illustration only and not for the purpose of limiting the scope of the invention.

As used in this specification, the term "source water" will be understood to mean preprocessed, dissolved oxygen-containing water from any source including saline surface water, ground water and sea water.

In processing a saline source water to the proper quality for injection into a hydrocarbon-bearing formation, the source water is filtered and deoxygenated so that the water will have no appreciable deleterious effect on the injection equipment, or ultimately, the hydrocarbon-bearing formation. Initially, the source water is pumped into a reservoir so that large solid particulates may settle out. Source water is then drawn from this reservoir and passed through a filter wherein solid particulates larger than about 2 to 4 microns are removed. The filtered source water is then subjected to deoxygenation in accordance with this invention prior to injection.

In accordance with the invention, the source water is deoxygenated by catalytic reduction of the dissolved oxygen with hydrogen to produce water. In order that the source water contain sufficient amounts of hydrogen for this process, the filtered source water is initially passed through an electrolytic cell which produces free hydrogen through electrolysis. The source water now containing additional dissolved hydrogen is then conducted through a catalyst bed principally comprising a group VIII B metal which causes the dissolved oxygen and hydrogen to react catalytically to produce water. The source water exiting from the catalyst bed commonly contains dissolved oxygen in the 20 parts per billion (ppb) or less range which is extremely desirable for preventing corrosion in oil field water injection equipment.

It is also common in the treatment of source water for injection to add a biocide to the source water so that biological growth on both treatment equipment and injection equipment as well as the hydrocarbon-bearing formation, is avoided. The present invention automatically provides for the addition of a biocide to the source water treatment system. As a by-product of the electrolysis process which produces the desired hydrogen for catalytic reaction with dissolved oxygen, chlorine is also produced in the electrolytic cell. The chlorine is extremely effective in its biocidal action. In accordance with a preferred embodiment of the invention, the bulk of the chlorine containing portion of the electrolyte of the electrolytic cell is withdrawn and conducted back to the source water reservoir where the chlorine effects its biocidal action. Thus, the settling and filtration of the source water also effectively removes bio-material prior to its entry into the electrolytic cell and, most importantly, the catalyst bed.

The preferred catalyst bed comprises finely divided metals from group VIII B of the Periodic Table. One preferred form of catalyst bed comprises ion exchange resin beads having a surface coating of palladium which is produced by Bayer and marketed by Mobay Chemical as Lewatit OC-1045. The catalytic reaction with dissolved oxygen involves the intermediate production of hydrogen peroxide which is immediately further reduced to water under the operating conditions of the system.

With the use of this deoxygenation process, source water having a dissolved oxygen content of, for instance, 3 to 8 parts per million can be reduced to injection quality water having a dissolved oxygen content of less than 10 to 20 parts per billion in 1 to 10 percent brine and in seawater. Beyond the initial investment for equipment and catalyst, the foregoing process results in an extremely economical, compact and lightweight system for deoxygenating saline source water to oil field injection quality.

Referring now to the drawing wherein the showing is for the purpose of illustrating a preferred embodiment of the invention only and not for the purpose of limiting same, the FIGURE shows a reservoir 10 which contains source water having dissolved oxygen therein. It will be understood that while a reservoir is preferred for the purposes of settling reduction of suspended solids, a reservoir is not necessary in that source water can be pumped directly into the system from the sea, subterranean formation or other water source.

A pump 12 pressurizes the flow-through system and the source water is conducted through a filter 14 wherein suspended particulates greater than about 2 to 4 microns are removed. The filtrate is then conducted to an electrolytic cell 16 where the source water is electrolyzed.

The electrolytic cell 16 comprises a fluid-permeable separator 18 dividing the electrolytic cell 16 into an anode chamber 20 having an anode 22 disposed therewithin and a cathode chamber 24 having a cathode 26 disposed therewithin. The fluid-permeable separator 18 may be of any form which permits the flow of fluid between the anode and cathode chambers 20, 24, respectively. Such materials as a perforated plastic plate, permeable diaphragm, etc. are appropriate. The fluid-permeable separator 18 preferably restricts the flow of fluid at its upper end to inhibit the migration of anolyte within the anode chamber 20 back into the cathode chamber 24.

The electrodes 22, 26 may be of any type suitable for water or brine electrolysis as is common in the art. While platinum may be used for both the anode 22 and the cathode 26, other conductive substrates may be used for these components such as carbon (graphite) or electrodes such as are commonly used in chlorine and caustic production. In this regard, the anode 22 may be of the so-called dimensionally stable type comprising an electrocatalytic metal or metal oxide coating on a titanium substrate while the cathode 26 may be steel, iron, or such materials with a coating which lowers the hydrogen discharge overpotential, such as a Raney-type nickel alloy. Any of such electrodes may be substituted in the electrolytic cell 16 in pursuance of a decrease in the discharge overpotential for both chlorine and hydrogen at the electrode surface thereby reducing the power requirements for the electrolytic process.

The anode 22 and cathode 26 are electrically connected to the positive and negative poles, respectively, of a direct current power supply source 30. Upon the application of current to the electrodes 22, 26, chlorine present in a saline source water is evolved at the anode 22 while hydrogen is evolved at the cathode 26. Due to migration of other ionic species in the electrolytic cell 16, sodium ions are concentrated in the cathode chamber 24 making the catholyte somewhat alkaline while the anolyte in the anode chamber 20 becomes acidic.

In accordance with the invention, the catholyte from the cathode chamber 24 is withdrawn therefrom and conducted to a catalytic resin column 32. In the column, the catholyte, containing dissolved hydrogen, is passed through the bed of catalyst-coated resin wherein dissolved oxygen is catalytically reduced to water with the hydrogen present in the system from its evolution at the cathode 26 of the electrolytic cell 16. The effluent from the catalytic resin column 32 is then monitored by a dissolved oxygen meter 34 for an appropriate dissolved oxygen level, generally 10 to 20 ppb or less and, assuming sufficient quality, passed on to water injection equipment for stimulating recovery from hydrocarbon-bearing formations.

If the dissolved oxygen level is too high following treatment, the flow rate of the source water through the system should be adjusted for a longer residence time in the catalytic resin column 32. Such procedures are well known in the art and may be modified as needed to obtain optimum oxygen reduction in the system.

In accordance with a preferred embodiment of the invention, the anolyte of the electrolytic cell 16 containing chlorine evolved at the anode 22 is preferably withdrawn from the anode chamber 20 and returned through a valve 36 to the source water reservoir 10. The biocidal activity of the chlorine thereby reduces the biological growth potential of the source water and permits its removal in the filter 14. This pretreatment of the source water with a biocide which is jointly produced with the desired hydrogen avoids the need for handling and storage of any additional biocides at the water treatment site as is common with prior art injection water upgrading systems. Also, high concentrations of chlorine have been shown to reduce the effectiveness of the catalyst due to degradation of the resin support material. Diversion of the anolyte with its high chlorine content back into the source water reservoir 10 avoids this potential problem and is, thus, preferred.

The following examples will illustrate the functioning of the preferred embodiment of the invention under various operating conditions. It should be understood that such examples are presented only in the interest of illustrating the invention and should not in any way be considered limitative on the scope of the invention.

EXAMPLE 1

A one weight percent sodium chloride brine was used as the source water in the apparatus of the FIGURE. At a temperature of 25° C., a flow rate of 200 milliliters per minute was maintained through the system. The applied current between the electrodes 22, 26 was gradually raised until a dissolved oxygen concentration read at the dissolved oxygen meter 34 was 20 parts per billion or less. It was found that 310 milliamps (mA) was required in a system utilizing platinum electrodes having one square inch of area each. The residence time for the source water in the catalyst bed was approximately 30 seconds.

EXAMPLE 2

Two weight percent and three weight percent sodium chloride solutions were tested in the apparatus and in the manner set forth in Example 1. It was found that 290 mA and 285 mA of current were required in the two and three weight percent brine solutions respectively. In the above examples, it was found that excess hydrogen over a stoichiometric amount did not affect the function of the system or the oxygen removal rate unless the gaseous hydrogen solubility limit was exceeded. Gas stripping led to instability of the catalyst scavenging system when the hydrogen solubility limit was exceeded.

EXAMPLE 3

As is known in the art of electrolytic cells, the catholyte, particularly adjacent the cathode 26 in the cathode chamber 24 becomes relatively highly alkaline as hydrogen is evolved at the cathode 26. This localized region of high alkalinity presents a potential for difficulty in the treatment of seawater in the system of this invention. Concentrations of calcium and magnesium ions in seawater tend to form hydroxide precipitates in the locally highly alkaline catholyte. The potential for electrode and system fouling with such calcium and magnesium hydroxide precipitates is apparent. However, because the alkalinity is high enough to precipitate such metal hydroxides in the immediate region of the cathode 26, a sufficient flow rate through the electrolytic cell 16 can be maintained so that such precipitates are swept from the region of the cathode into the less alkaline portions of the catholyte wherein the hydroxides redissolve. Optionally, a filter to remove precipitates may be interposed between the electrolytic cell 16 and the catalytic resin column 32.

EXAMPLE 4

In an attempt to determine the catalyst life, a 10 weight percent sodium chloride and 2 weight percent calcium chloride brine was run continuously in the system shown in the FIGURE for a period of over 100 hours with residual oxygen concentration being measured consistently at below 10 parts per billion. Additionally, the system was operated for over a 60 hour period utilizing synthetic seawater and the same catalyst material. At all times, the catalyst continued to perform its task of removing dissolved oxygen without any sign of catalyst deactivation. Upon examination, the catalyst showed no signs of scaling or fouling. Apparently, the catalyst lifetime is essentially unlimited if fouling is avoided. Backwashing the catalyst system with concentrated sodium hydroxide solution has been shown to effectively regenerate the catalyst, however.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of the invention as limited only by the appended claims.

Having thus described our invention, we claim:

1. A process for removing dissolved oxygen from saline source water comprising the steps of:
    filtering the saline source water to remove suspended solids,
    electrolyzing the saline source water to evolve hydrogen gas at a cathode of an electrolytic cell, and
    conducting the saline source water containing the evolved hydrogen through a bed of deoxygenation catalyst selected from group VIII B metals of the Periodic Table which effects the removal of dissolved oxygen through a catalytic reaction with evolved hydrogen to form water.

2. The process as set forth in claim 1 further including the step of injecting the effluent, deoxygenated saline source water from the catalyst bed into a hydrocarbon-bearing formation.

3. The process as set forth in claim 1 further including evolving chlorine gas at an anode of the electrolytic cell and utilizing the chlorine gas as a biocide treatment for the saline source water.

4. The process as set forth in claim 3 wherein the step of utilizing the chlorine comprises injecting the evolved chlorine gas into the saline source water prior to the step of filtering.

5. An apparatus for removing dissolved oxygen from saline source water comprising a reservoir of saline source water, conduit means connecting said reservoir to a filter for removing suspended solids from said saline source water; conduit means for conducting filtered saline source water to an electrolytic cell having a cathode chamber with a cathode disposed therein, an anode chamber with an anode disposed therein, and a fluid permeable separator between said anode chamber and said cathode chamber, and a source of direct current connected to said anode and said cathode for electrolyzing said saline source water to evolve hydrogen at the cathode and chlorine at the anode; conduit means connecting said cathode chamber to a catalyst chamber containing a bed of deoxygenation catalyst selected from group VIII B metals whereby said catalyst effects the reaction of dissolved oxygen and evolved hydrogen to produce water thereby lowering the dissolved oxygen content of the saline source water.

6. The apparatus as set forth in claim 5 further including conduit means for conducting anolyte containing dissolved chlorine from said anode chamber to said reservoir.

7. The apparatus as set forth in claim 5 wherein said separator includes means for inhibiting the back migration of a fluid from said anode chamber into said cathode chamber.

8. The apparatus as set forth in claim 5 further including means for determining the dissolved oxygen content of said saline source water following said catalyst bed.

9. The apparatus as set forth in claim 5 wherein said catalyst bed comprises palladium coated anion exchange resin beads.

* * * * *